(12) United States Patent
Roskowski et al.

(10) Patent No.: US 7,826,847 B1
(45) Date of Patent: Nov. 2, 2010

(54) NEIGHBOR LIST GENERATION IN WIRELESS NETWORKS

(75) Inventors: Steve Roskowski, Los Gatos, CA (US); Bruce Alan Leak, Los Altos Hills, CA (US)

(73) Assignee: Carrier IQ, Inc., Mountain View, CA (US)

( * ) Notice: Subject to any disclaimer, the term of this patent is extended or adjusted under 35 U.S.C. 154(b) by 780 days.

(21) Appl. No.: 11/777,950

(22) Filed: Jul. 13, 2007

Related U.S. Application Data

(60) Provisional application No. 60/807,447, filed on Jul. 14, 2006.

(51) Int. Cl.
*H04W 36/00* (2009.01)

(52) U.S. Cl. .................... 455/436; 455/440; 455/432.1; 455/433

(58) Field of Classification Search ........................ None
See application file for complete search history.

(56) References Cited

U.S. PATENT DOCUMENTS

| | | | |
|---|---|---|---|
| 5,889,474 A | 3/1999 | LaDue | |
| 6,073,021 A * | 6/2000 | Kumar et al. | ................ 455/442 |
| 6,097,336 A | 8/2000 | Stilp | |
| 6,167,358 A | 12/2000 | Othmer et al. | |
| 6,205,326 B1 | 3/2001 | Tell et al. | |
| 6,266,788 B1 | 7/2001 | Othmer et al. | |
| 6,516,198 B1 | 2/2003 | Tendler | |
| 6,529,136 B2 | 3/2003 | Cao et al. | |
| 6,745,011 B1 | 6/2004 | Hendrickson et al. | |
| 6,754,470 B2 | 6/2004 | Hendrickson et al. | |
| 2002/0072359 A1 | 6/2002 | Moles et al. | |
| 2003/0159088 A1 | 8/2003 | Phillips et al. | |
| 2003/0210713 A1* | 11/2003 | Abdel-Ghaffar | ............ 370/503 |
| 2005/0020203 A1* | 1/2005 | Losh et al. | ................. 455/11.1 |
| 2005/0232199 A1* | 10/2005 | Liu et al. | .................... 370/331 |
| 2006/0007870 A1 | 1/2006 | Roskowski et al. | |
| 2006/0007901 A1 | 1/2006 | Roskowski et al. | |
| 2006/0023642 A1 | 2/2006 | Roskowski et al. | |
| 2008/0186922 A1* | 8/2008 | Merson et al. | ............... 370/331 |

* cited by examiner

*Primary Examiner*—Ajit Patel
(74) *Attorney, Agent, or Firm*—Workman Nydegger

(57) ABSTRACT

Generating neighbor lists. A set of devices are provisioned to report on neighbor lists and visibility of sectors. Each device in the set of devices generates event data that includes the neighbor list from a sector, other sectors visible while using the neighbor list, and/or sectors visible to the device if the call was dropped or lost. The event data can be recorded or stored by the device or forwarded to a server immediately or at a later time. The event data of each device is received at and recorded by a management system. The management system can derive recommended neighbor lists for each sector in a wireless network based on the cumulative event data received from the set of devices operating in the network.

30 Claims, 3 Drawing Sheets

NEIGHBOR LIST GENERATION IN WIRELESS NETWORKS

CROSS REFERENCE TO RELATED APPLICATIONS

This application claims the benefit of U.S. Application Ser. No. 60/807,447, filed Jul. 14, 2006 and entitled NEIGHBOR LIST GENERATION IN WIRELESS NETWORKS, which application is incorporated by reference in its entirety.

BACKGROUND OF THE INVENTION

1. The Field of the Invention

The present invention relates generally to the operation of devices in wireless networks. More particularly, embodiments of the invention relate to systems and methods for generating neighbor lists used by devices operating in wireless networks.

2. The Relevant Technology

The convenience and utility of wireless devices including cellular phones is undeniable. However, there are instances where a user is unsatisfied. Whenever a user is unable to access a wireless network or whenever a user experiences a dropped call, the user is inconvenienced and unsatisfied with the performance of the wireless network. As a result, providers of wireless networks often strive to ensure that a wireless device has access to their wireless network and to ensure that adverse experiences such as dropped calls do not occur.

To achieve these goals, a wireless provider typically deploys multiple towers in the wireless network in a manner that is intended to provide satisfactory coverage. The towers are hopefully arranged in a manner that ensures, regardless of where a particular device is located in the wireless network, that the particular device has access to the network without experiencing problems such as a dropped call or weak signal.

One of the key features of wireless devices is that they are mobile in nature and are therefore unlikely to remain in the same location, even during a single call. People often use their cellular devices, for example, as they travel within the network. Because of this movement, a user is often likely to move out of the range of a particular tower and the need to switch the call over to another tower therefore arises. Further the towers used during use of the devices in the network are often approached using different paths and from multiple directions.

One of the ways that a wireless provider ensures that a call can be switched from one tower to the next and therefore ensure that the call is not dropped is through the use of neighbor lists. During a call from a wireless device, the primary sector of a tower provides the wireless device with a neighbor list. The neighbor list identifies other towers or tower sectors that the wireless device may encounter during the call. As the device changes from one primary sector to a new primary sector, the neighbor list is updated or replaced by the new primary sector.

Unfortunately, one of the common problems experienced in wireless networks is related to the neighbor list. There are many factors, for example, that make it difficult to identify the tower sectors that should be included in the neighbor list of a given sector. Variable radio propagation due to contributing factors such as terrain, deployment errors, power changes, and load based changes are examples of factors that can impact the sectors that a wireless device might encounter. As a result, the actual neighbor lists do not necessarily include all of the neighbors of the primary tower sector. Further, because users are traveling in different directions and in different paths with respect to primary sectors, their respective device are typically exercising a different portion of the primary sector's neighbor list. In other words, neighbor lists describe the possible transitions from one sector to another sector. However, making a transition from one tower sector to another tower sector may depend on the path of the user, direction of travel of the user, and other factors.

As a result of these factors, neighbor list problems can be very difficult to resolve via field testing because of all the possible paths and directions of travel that exist. In other words, different paths may indicate that different parts of a neighbor list are exercised. Thus, neighbor list are used to ensure that a call can transfer from one sector to another sector in a manner that is transparent to the user and without adversely impacting use of the device.

However, there are still problems that arise in a network that are attributable to neighbor lists. One example relates to neighbors that are not included in a neighbor list. While the fact that a particular tower sector is not included on a neighbor list may seem inconsequential, it in fact can disrupt the use of a cellular device. For example, assume that there is a tower sector that is not currently on a neighbor list of a wireless device. If this tower sector becomes a strong radio source due to environmental changes or other factors, then it is likely that the cellular communication will be lost or dropped due to interference from the missing neighbor. In other words, tower sectors that are not included in a neighbor list can interfere with existing communications and cause calls to be lost. For these and other reasons, neighbor list errors can disrupt cellular service in addition to inconveniencing users. Systems and methods are therefore needed to reduce neighbor list errors as well as to more effectively identify ideal neighbor lists for the tower sectors in a wireless network.

SUMMARY OF THE INVENTION

These and other limitations are overcome by embodiments of the invention, which relate to systems and methods for generating recommended neighbor lists for sectors of towers in a wireless network. A set of devices operating in the network collects data related to neighbor lists and uploads the collected data to a management system. The management system can evaluate the cumulative data to derive recommended neighbor lists. In some instances, additional sectors are added to the recommended neighbor list while in other situations, sectors may be excluded from the recommended neighbor list. Also, a particular sector can distribute distinct neighbor lists to different devices based on device usage or expected usage.

In one example, a system receives event data from devices operating in a wireless network. The event data typically includes a neighbor list that was used as well as the sectors that were visible to the device while using the corresponding neighbor list. When event data is received from multiple devices, the cumulative event data similarly includes neighbor lists as well as a list of sectors that were visible while using the neighbor lists. The cumulative event data can be reviewed for one or more sectors to derive the recommended neighbor lists for the one or more sectors. More particularly, the cumulative event data can be reviewed to identify the neighbor list associated with a particular sector as well as identify the sectors that were visible to devices that used that neighbor list. This information can be used to generate a recommended neighbor list. The cumulative event data can similarly be used to generate the recommended neighbor lists for the various sectors, which can then be pushed to the relevant sectors. These sectors then deliver the new neighbor lists to devices in the network as needed. As the cumulative event data increases over time, the recommended neighbor lists become more ideal and account for many of the factors or parameters in a network that often contribute to neighbor list errors.

In another embodiment, the generation of a recommended neighbor list for a given sector begins by recording a current neighbor list as it is received at a device or that is provided to that sector. The current neighbor list typically identifies sectors that should be visible to the device. During use of the device, a user may be transferred to one of the sectors on the neighbor list. The device then records each sector that is actually visible to the device while using the current neighbor list. Often, the devices are first provisioned with a collection profile that enables the appropriate data to be recorded as event data.

After experiencing an event, such as a dropped call, that resets the state data of the device, the device may record additional sectors that become visible to the device, but were not included in the current neighbor list. The resulting event data is provided to a management system, which uses the event data along with event data from other devices operating in the network to generate a recommended neighbor list that incorporates the actual performance of the network from the perspective of the devices operating in the network. In some instances, the management system may filter the cumulative event data using a neighbor list signature to identify the event data that is presumably associated with or attributable to a neighbor list problem.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

Figure 1:
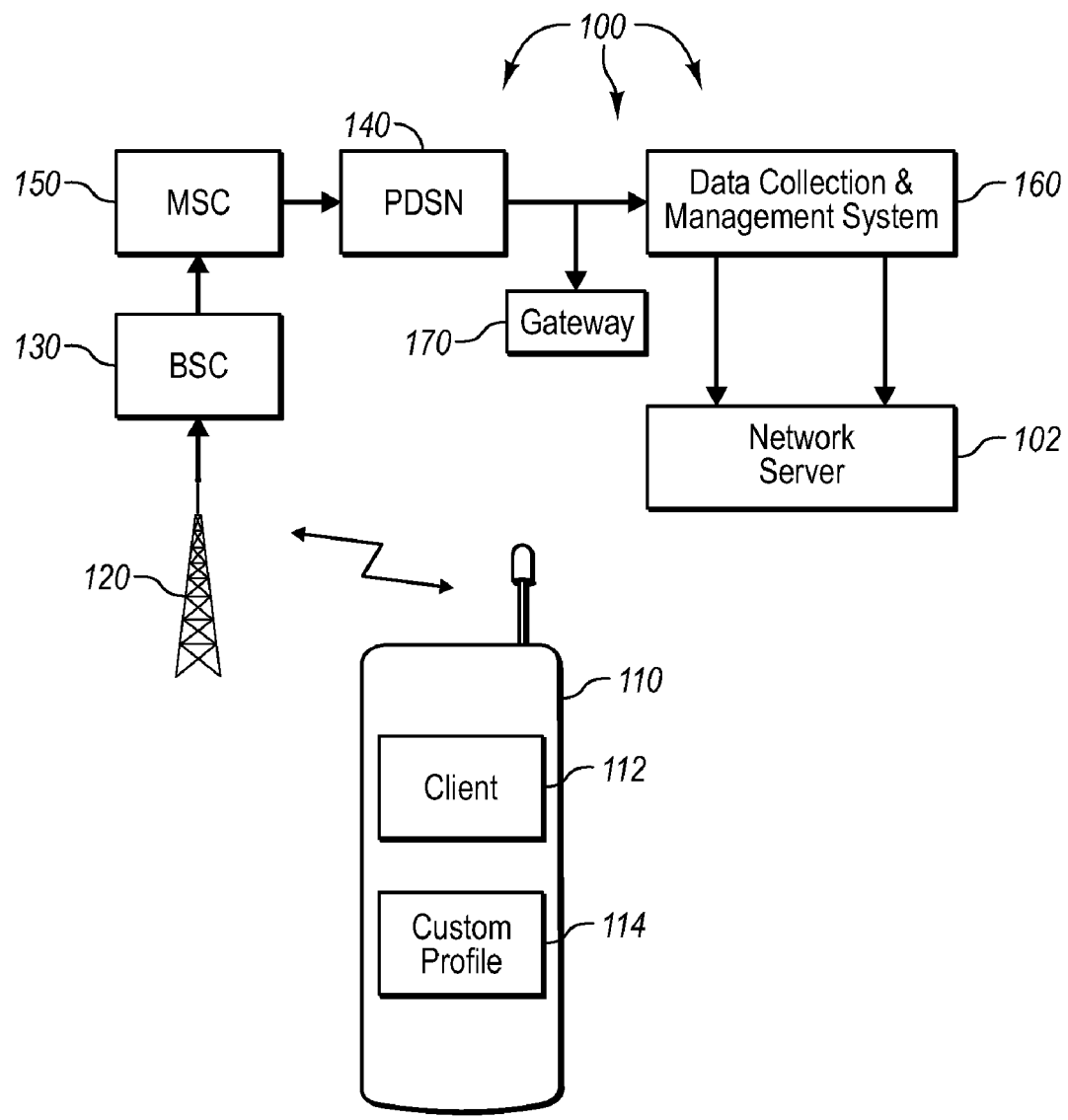
FIG. 1 illustrates one embodiment of a communications network over which wireless communications can be transmitted.

Embodiments of the invention relate to providing guidance information to devices that participate in wireless networks. The guidance information includes the information that enables a device operating in a wireless network to maintain the connection over time and as the device moves throughout the network. The guidance information typically provided to a device enables the device to maintain the connection over time. Often, this guidance information can be updated or refreshed.

In some instances, however, the guidance information may be incomplete or incorrect for various reasons, including radio related issues. Embodiments of the invention therefore relate to systems and methods to improve the guidance information distributed to devices. Once the guidance information is analyzed and updated, in can be distributed and used from that point on.

In one example, the wireless network provides guidance information to the devices participating or operating in the wireless network. The guidance information can be part of the network configuration. In some instances, the guidance information can vary for different elements or sections of a network.

A method for configuring the wireless network often begins by having wireless devices record event data. The event data recorded can reflect one or more events that occur to a device and can be related to network communications. In one example, the event data received from or collected by devices includes radio information. The radio information typically identifies one or more of current guidance information utilized by the wireless devices (often, the guidance information is specific to an element of the network or to a particular region), radio resources utilized at the time of the events included in the event data (each event may be associated with different radio resources), and other radio elements of the network utilized during the one or more events included in the event data. The event data including the radio information can be provided to a data collection and management server. The server utilizes the event data to generate new configuration data to be distributed as guidance information to the wireless devices for subsequent events.

One example of guidance information includes neighbor lists that are typically used in the configuration of wireless cellular telephone networks. Embodiments of the invention thus relate to improving the performance of a wireless network at least by resolving neighbor list errors. More particularly, embodiments of the invention relate to generating and/or optimizing neighbor lists that are distributed by sectors in a wireless network. Neighbor lists often act as a constraint on a device by restricting the sectors that a device may look to for radio communication. As previously indicated, neighbor list errors can interfere with usage of a wireless device.

Neighbor list errors are reduced or eliminated by provisioning wireless devices with the ability to collect information related to neighbor lists. Wireless devices can then capture event data that identifies the tower or tower sector (also referred to herein as pilot) that provided the neighbor list to the device. The event data of the device also identifies all of the sectors that are seen by the device while using that specific neighbor list. Event data is not limited to the information collected during or after a call, but includes situations where the device collects information about the network when the device is not being used. The cumulative event data collected or received from multiple devices can then be systematically analyzed to ascertain the best neighbor list that a device should receive from a sector.

The event data collected from the device can be further augmented with data collected shortly after the termination of a call while utilizing a specific sector. During normal operation, a device will typically re-establish network connectivity after each call. The after-call sector information has less reliance on the existing neighbor list. As a result, if a sector is missing from a specific neighbor list, it is most likely to be discovered by the device at the point of network acquisition immediately after the call. The analysis can result in the addition and/or removal of certain sectors from the neighbor lists that are delivered to and used by wireless devices.

A wireless device, as used herein, enables an end user to gain access to telephony services and may be equipped to provide access to Internet or multimedia data through any suitable protocol that allows a wireless device to participate in a packet data network. A wireless device may be, by way of example, a cellular telephone, a personal digital assistant (PDA), a laptop computer, or another wireless communication device.

Reference will now be made to the drawings to describe various aspects of exemplary embodiments of the invention. It should be understood that the drawings are diagrammatic and schematic representations of such embodiments and, accordingly, are not limiting of the scope of the present invention, nor are the drawings necessarily drawn to scale. Although embodiments of the invention are described in the context of wireless networks and with particular attention to neighbor list errors, of skill in the art, with the benefit of the present disclosure, can appreciate the applicability of the invention to other problems in a wireless network that may result in network disruptions or end user inconveniences.

In order to describe the various methods of the invention, FIG. 1 illustrates an example of a wireless network 100 in which embodiments of the invention can be practiced. It should be understood, of course, that this and other arrangements and processes described herein are set forth for purposes of example only, and other arrangements and elements and network configurations may be included in the network 100. Further, those skilled in the art will appreciate that many of the elements described herein are functional entities that may be implemented as discrete components or in conjunction with other components, in any suitable combination and location, and by software, firmware and/or hardware.

In this example, the wireless network 100 is described and illustrated as a Code Division Multiple Access (CDMA) 1XRTT network, whereas the invention can be practiced with other wireless networks, including Universal Mobile Telecommunications System (UMTS), Time Division Multiple Access (TDMA), Wideband Code Division Multiple Access (WCDMA), General Packet Radio Service (GPRS) networks, 802.11 networks and other networks, including those that will be developed in the future. Generally stated embodiments of the invention can be practiced in networks that provide information to devices that describe the radio environment for the device.

The wireless network 100 includes a radio frequency (RF) network that provides radio connectivity and session management for circuit-switched and packet data technology-based communication. Accordingly, wireless network 100 includes or interfaces with all of the elements necessary to route circuit-switched telephone calls and/or packet data communication through the network, including one or more wireless devices 110, a base station 120, base station controller (BSC) 130, mobile switching center (MSC) 150 and a packet data serving node (PDSN) 140. More specifically, the methods of the invention can be used in conjunction with a circuit-switched network, a packet data network, or both.

Some embodiments of the invention use Internet Protocol (IP), short message service (SMS), Short Data Burst services and/or other transport protocols. Wireless network 100 may also include a Home Location Register (HLR), Visiting Location Register (VLR), billing and provisioning systems, one or more gateways 170, the servers and infrastructure necessary to use short message service messages, and may include many other network elements. Application servers or third party reporting systems (depicted as network server 102 in the exemplary embodiment), may reside outside network 100 and can be used in conjunction with the present invention. Alternatively, the network server 102 may be part of the data collection and management system 160.

The data collection and management system 160, while depicted for purposes of illustration as functioning in conjunction with the packet data network, may receive data from nodes on a circuit-switched network or elements of the system may be located in a circuit-switched network and receive data from a packet data network. Gateways 170, network monitors and other network elements may be employed to facilitate transmission of data between the networks and the data collection and management system 160. Furthermore, in one embodiment, elements of data collection and management system 160 may be implemented on one or more network servers residing within the network. Alternatively, data collection and management system 160 may be implemented as a service hosted by a service provider other than the network operator, and elements of the system may therefore reside outside the network and be equipped to communicate with the various nodes in the network operator's network.

In FIG. 1, the device 110 collects event data that occurs at or is available to the device 110. Event data can be collected before, after, and/or during usage of the device 110. Event data can also be collected when the device is not being used. Receiving a neighbor list from a primary sector is an example of an event for which event data is collected. To collect event data, the client 110 has been provisioned with a client 112 that is configured to detect and record certain events or data that may be relevant to the device 110. In this example, the client 112 is configured to collect data related to the neighbor lists used by the device 110 to communicate in the network 100. As described in more detail below, the event data may also include information about the other towers and tower sectors that the device 110 sees or that are in radio communication or contact with the device 110. Because it is likely that the device 110 will use more than one neighbor list over time, the event data that is collected can be specific to the neighbor lists actually received by the wireless device 110.

The event data collected by the device 110 may also identify all of the sectors that are in radio contact with a device. The device 110 may identify the order in which the sectors were encountered as well. This information can also be used in the generation of neighbor lists that are distributed by sectors. In some instances, this information can be used to generate multiple neighbor lists that may be based, for example, on device usage. As a result, the neighbor list distributed to one device may differ from the neighbor list distributed to another device.

After the event data is generated, the event data collected by the client 112 can then be uploaded to the data collection and management system 160. Alternatively, the event data can be stored at the device 110 for some period of time and then transmitted at a later time. The cumulative event data collected by the system 160 from multiple devices can then be analyzed to determine the best neighbor list for pilots or sectors in the wireless network. The cumulative event data collected in this manner from a large set of wireless devices ensures that the resulting neighbor lists account for multiple paths and directions that a wireless device may follow within the network 100. The neighbor lists generated and recommended in this manner can then be pushed to the relevant towers and tower sectors, which then provide them to the various devices that communicate with the tower sectors. As a result, the neighbor lists can improve over time as additional event data is collected from the wireless devices operating in the wireless network 100.

In one embodiment of the invention, the data collection and management system 160 provides a service quality platform to dynamically generate and download, to a population of wireless devices, rule-based data collection profiles such as the collection profile 114. Data collection profiles may be generated manually by a network administrator, a software developer or other personnel involved in the operation of the network, created offline as a portion of a data analysis solution, or automatically generated based on network parameters or other events.

Data collection profiles define what information is to be collected on the devices in response to which conditions and events, as well as the conditions and events that cause the device to upload the collected information. Conditions or events include any occurrence in the network or on the device that the device can sense, such as receiving a neighbor list, or being in radio contact with other sectors in addition to a primary sector. Conditions or events may also include, by way of example, call dropping or a user pressing a button on the device. Conditions and events also include the passage of time, or a request from a network administrator that the device report information back to the server.

In the exemplary embodiment, a population of wireless devices that is to receive the data collection profile and execute data collection may be selected based on the characteristics, capacity, and availability of an end user's wireless device. As part of the wireless device qualification and selection process, particular attention is directed to implementing the collection of data in such a way as to avoid overwhelming end user devices. Similarly, when defining the data collection rules in the data collection profile, consideration is given to the impact on device and network resources of the desired data collection activity, and the rules defining profile download, data collection, and upload of collected data are defined in such a way as to avoid adversely impacting network performance.

For example, uploading collected data may occur only in off-peak times when device and network activity is particularly low. Furthermore, because network monitoring and data collection activity is expensive in terms of the device and network resources utilized, in addition to the rigorous device qualification process, methods of the invention provide the ability to structure a data collection profile to ensure that extraneous data is filtered during the data collection process and that only the most relevant and reliable data is presented for analysis with regard to a particular issue.

In this example, the collection profile 114 is configured to record events that are related to neighbor lists, and sector usage. For each neighbor list received from a tower sector, the collection profile 114 ensures that the neighbor list, along with the sector than sent the neighbor list are recorded as event data. In one embodiment, the contents of the neighbor list may be included as part of the event data. In another embodiment, a unique identifier of the neighbor list (such as a hash of the message contents) may be utilized to reduce the size of the event metric. In the latter embodiment, the system would correlate the combination of unique sector identifier and neighbor list reference to recover the neighbor list in question from an appropriate network element as necessary.

Periodically throughout the call, as part of normal operation, the device automatically searches for new sectors. Periodically or as new sectors are identified, an event metric is generated that reflects the visible sectors to the device. The accumulation of these event metrics is the set of all sectors that the device 110 could see at the while utilizing the sector supplying the neighbor list as this reference sector.

During the course of a given radio session, the device may utilize different sectors as reference. Each time a new sector become the reference or the primary sector, the device and network automatically exchange the neighbor list of the new sector. As discussed above, a new neighbor list event metric is typically generated and an accumulation of viewed sectors is initiated. Thus, over the course of a call, the neighbor lists of multiple sectors can be collected for analysis by the system.

If an event occurs, such as a dropped or lost call, the device automatically resets its neighbor lists and reacquires the network. Once the network has been reacquired, the system will download the neighbor list from the new reference sector. However, prior to that point, the device is not constrained and may perform a broader search for sectors. As a result, it is most likely to find a sector missing from a neighbor list in that interval. As such, the sector information captured immediately after a call, including the new reference sector can be added to the list of sectors that are associated with the previous sector and included in the event data.

A further refinement of the solution is to determine if the dropped call is specifically attributable to a neighbor list error, in which case the system can refine the process by which a revised neighbor list is provisioned to the affected network elements.

As one of skill in the art is aware, a neighbor list error is not always responsible for a dropped call or other event that occurs at a wireless device. Embodiments of the invention may also use event signatures to identify when the root cause of a particular event is likely to be a neighbor list error. For example, if a call is lost and a new sector is discovered as the device resets, it is likely that a neighbor list error was responsible for the lost call. The discovery of a new sector can be part of the signature that is used to identify neighbor list errors. This signature of a neighbor list error can be refined using other characteristics that are common to neighbor list errors. For instance, the relative strength of the newly discovered tower, phase of the received signals from one or more of the sectors detected by the device, and the like may be considered when determining if the root cause of an event was a neighbor list error. In this sense, the event data received from the set of wireless devices that are provisioned with the collection profile 114 can be filtered using the signature of a neighbor list error to increase the effectiveness and efficiency of the neighbor list that is ultimately recommended after analyzing the event data received from the set of wireless devices.

Figure 2:
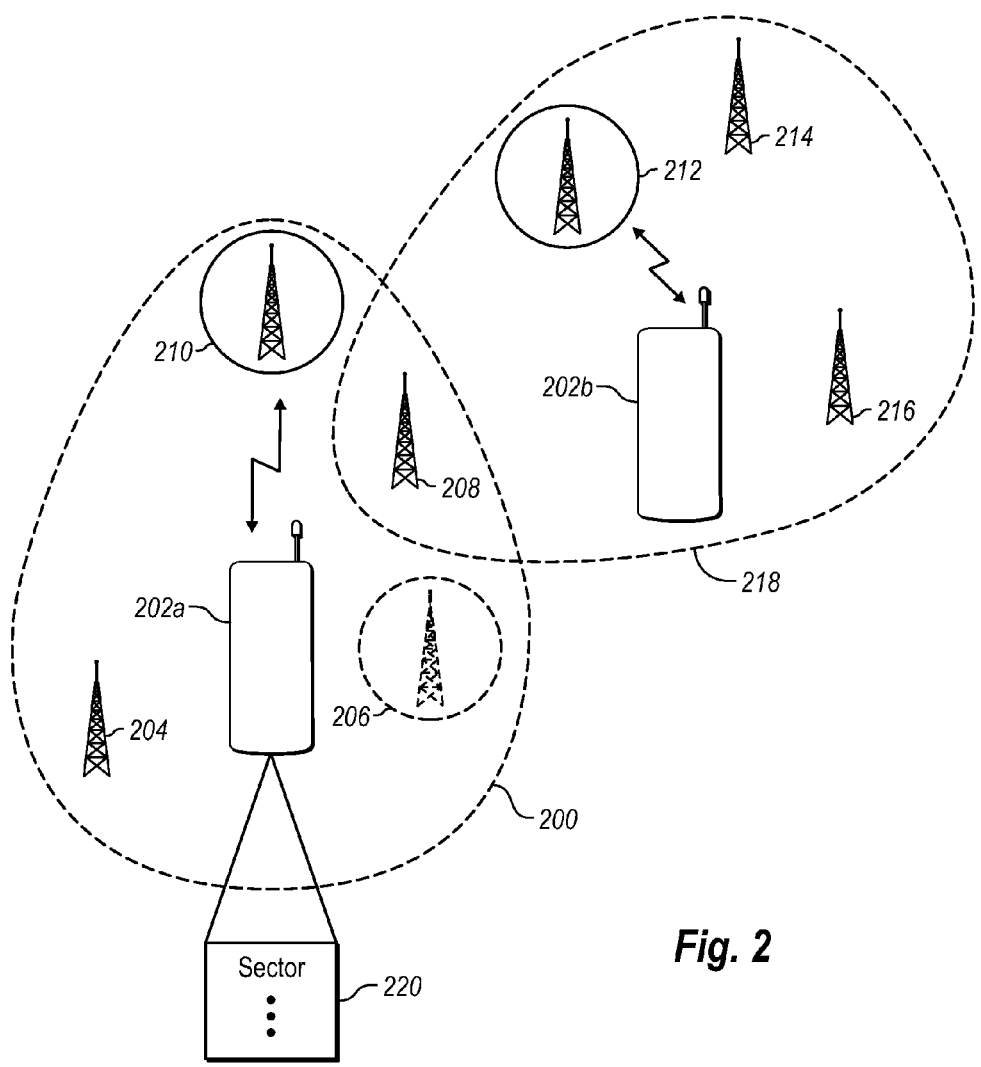
FIG. 2 illustrates an exemplary environment where a device receives a neighbor list from a sector.

In a typical wireless network, each tower has more than one sector. A tower may have three sectors or pilots, for example. As a result, the neighbor list may identify specific sectors and/or specific towers. FIG. 2 is a block diagram illustrating the path or direction of travel that an exemplary device may follow in a wireless network and illustrates that a device may communicate with certain sectors of a tower. In this case, the device 202*a* represents a device in a first location and the device 202*b* represents the same device in a second location. As will be described, the neighbor list changes as the device moves from the first location to the second location.

In this example, the primary sector or pilot for the device 202*a* is from the tower 210. The primary sector is the sector that is currently handling the call or use of the device 202*a*. The device 202*a* may be in radio contact with other sectors, but the overall communication is managed through the primary sector. Thus, in this example, the call of the device 202*a* is completed through a specific sector of the tower 210.

When the call was initiated by the device 202*a*, a sector of the tower 210 delivered a neighbor list 220 to the device 202*a*. In this case, the neighbor list 220 identified certain sectors 208 and 204 which are on different towers. Further, the device 202*a* may receive signals from sectors 204 and 208 or see them. Because the device 202*a* is aware of these sectors 204 and 208, their radio signals do not interfere with the call.

In this example, the sector 206 is not on the neighbor list 220. As a result, the device 202*a* may not see or recognize the sector 206 and the radio signal from the sector 206 may interfere with the call and cause a lost or dropped call. Before the call is dropped, however, the neighbor list 220 is recorded along with other information in event data maintained by a client operating on the device 202*a*. Alternatively, the radio signal from the sector 206 is recorded in event data after the call is dropped.

More particularly, the event data includes the neighbor list 220 and identifies the tower and sector that delivered the neighbor list 220. The event data may also include whether the device 202*a* can see or actually receives radio signals from the sectors included in the neighbor list 220. It may be the case that the device 202*a* is not in radio contact with a particular tower sector even if the tower sector is on the neighbor list 220.

After a call is lost and the device resets, all of the sectors that the device 202*a* can see or are in radio contact with the device 202*a* are also included in the metrics of the event data. After the dropped call in this example, the device 202*a* may see the sectors 210, 208, 204, and 206 as indicated by the set 200. This information is included in the event data. The set 200 is considered, in one embodiment, the set of sectors that the device 202*a* believes should be in the neighbor list delivered by the tower 210. If a significant number of other devices also report that the set 200 is the set of towers that should be included in the neighbor list 220, then the neighbor list 220 can be updated quickly. In other words, the neighbor lists can be improved using the event data provided by a set of wireless devices.

As the device moves in the network to the location represented by the device 202*b*, the call is ultimately transferred to the primary sector 212 and the neighbor list 220 is either updated or replaced by the primary sector 212. The set 218, which includes the sectors 208, 214, and 216, represents the set of sectors that are presently on the neighbor list 220 provided by the sector 212. The set 218 may also represent the set of sectors that the device 202*b* thinks should be on the neighbor list received from the reference sector 212. The cumulative event data from a large set of wireless devices operating in a wireless network enables the recommended neighbor lists, which are derived from the cumulative event data, to account for many of the factors that contribute to neighbor error lists.

Figure 3:
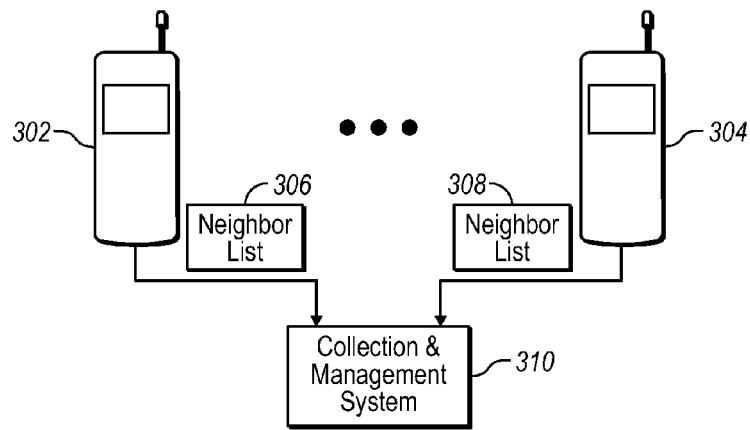
FIG. 3 illustrates an example of a system for collecting and evaluating neighbor lists from devices operating in a network to improve the neighbor lists distributed to the devise.

FIG. 3 is a block diagram illustrating the collection of event data including neighbor lists. In this example, the devices 302 and 304 represent a set of devices that have been provisioned with a client and a collection profile. The collection profile effectively configures the devices 302 and 304 to collect the event data that can be used to evaluate neighbor lists and ultimately reduce or eliminate neighbor list errors. The devices 302 and 304 collect information related to neighbor lists when calls are dropped or lost as well as when the call is not dropped or lost.

Further, the devices 302 and 304 may collect the same information regardless of whether the root cause of a dropped or lost call (or other event) was a neighbor list error. The collection and management system 310 typically has more processing power available to examine the context of the various events to ascertain whether the likely root cause of the event was a neighbor list error. Thus, the event data reported by the devices 302 and 304 includes information relating to neighbor lists and may include other contextual metrics that enable the collection and management system 310 to determine whether the likely root cause of an event was a neighbor list error. As previously described, for example, a signature may be applied to the collected event data to ensure that the root cause of an adverse event experienced by a device is attributable to a neighbor list error.

In FIG. 3, the event data including the neighbor list data 306 and 308 are delivered to the data collection and management system 310. As previously described, the neighbor list data includes at least the neighbor list provided by the primary sector as well as other sectors that the device was aware of or that the device thought should be in the neighbor list. The data 306 and 308 can also include information collected after an event is experienced or collected at any other time. The data 306 and 308 can also identify sectors that were in radio contact with the devices 302 and 304 as well as the order in which radio contact was made. In other words, the neighbor list data 306 and 308 may include sectors that are not found on the neighbor list provided by the primary sector. This information is accumulated by the system 310. Over time, and after receiving neighbor list data 306 and 308 from a large number of different devices, the system 310 can generate recommended neighbor lists that are derived directly from the cumulative neighbor list data provided by the set of devices represented by the devices 302 and 304.

The neighbor list data 306 and 308 collected by devices 302 and 304 as they experience events such as dropped calls can therefore be used to eliminate neighbor list errors. The elimination of neighbor list errors translates directly to fewer dropped calls in the wireless network. Further, by collecting event data from multiple devices, the collection and management system 310 can generate and recommend a neighbor list that accounts for multiple device paths, directions or travel, and device locations within the wireless network. The collection and management system 310 can also generate multiple neighbor lists for a given sector. The specific neighbor list distributed to a device may therefore account for device usage or expected device usage.

Collecting event data that includes neighbor list data from multiple devices enables neighbor lists to be generated that account for variable radio propagation, unknown terrain that can impact the visibility of sectors in some instances, deployment errors in the network configuration, power changes, and load based changes. The resulting neighbor lists also account for the multiple paths and directions of travel that a device may experience such that different portions of the neighbor lists are exercised. The neighbor lists determined in this manner can then be pushed to the relevant sectors in the wireless network and then delivered to end user devices. Over time, the neighbor lists received by devices in the network are more accurate and the occurrence of events due to neighbor list errors decreases.

Figure 4:
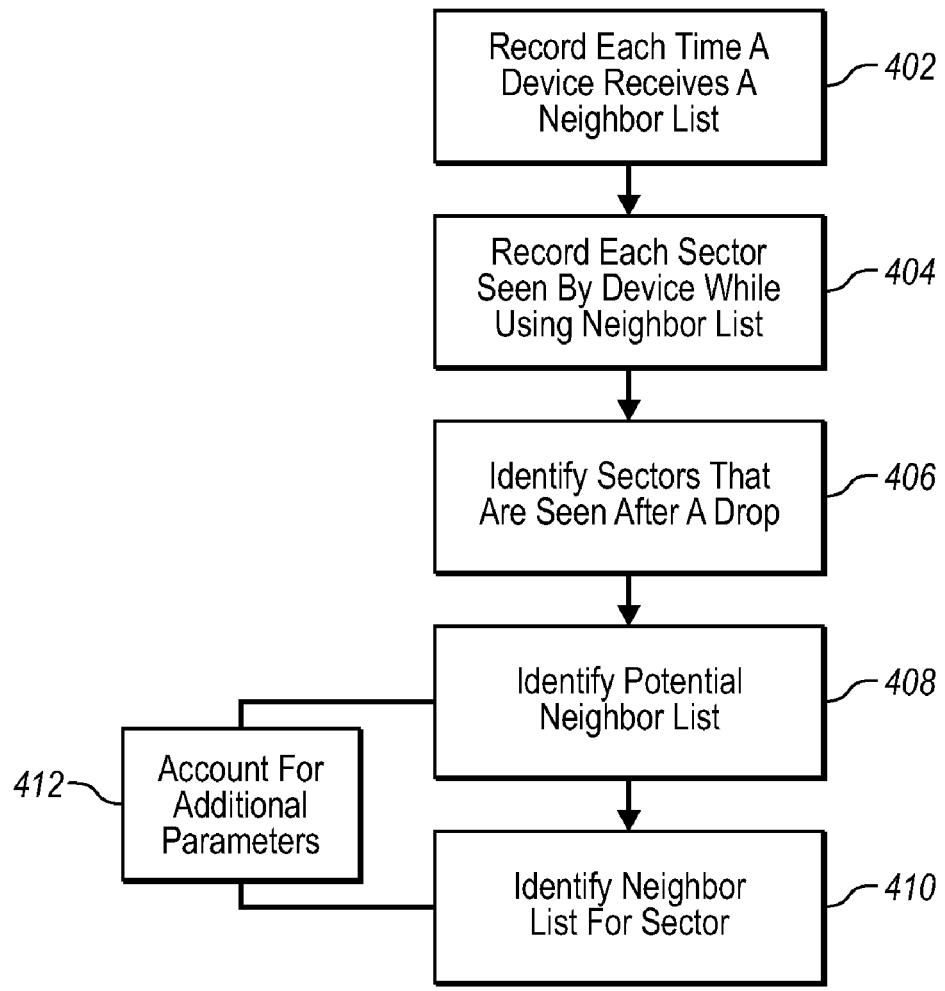
FIG. 4 is a flow diagram illustrating an exemplary method for generating neighbor lists.

FIG. 4 illustrates an exemplary method for generating neighbor lists. This embodiment begins by recording 402 event data when a device receives a neighbor list. As previously discussed, the neighbor list identifies a set of towers or sectors that the device expects to see. The device also records 404 the sector(s) seen by the device while using the neighbor list. This information by itself, when combined with similar data from other wireless devices can be used to enhance neighbor lists. For example, the neighbor list may include sectors that are not visible to the device. If other devices report similar event data, then the sector that is not visible becomes a candidate for removal.

Next, the method continues by identifying 406 sectors that are seen by the device after a dropped call or other event. The sectors seen or in radio contact with the device can also be identified when a call is completed normally in addition to when an adverse event such as a dropped call occurs. In this example, the device may be configured to identify sectors that are seen by the device after a dropped call but that were not present in the neighbor list that was being used by the device prior to the dropped call. This can be achieved at the device or at the collection and management system by performing a compare between the sectors currently seen by the device with the metrics recorded during the call or to the previous neighbor list. As previously stated, the event data may be filtered using an event signature to provide more assurance that the reason for the event was a neighbor list error. Further, it may not be necessary for the device to record the initial neighbor list as that information is typically known and can be readily ascertained.

Identifying sectors 406 that are seen or are in radio contact with a device can be used for more than adding sectors to a neighbor list. Embodiments of the invention contemplate using the sectors identified by a device regardless of whether a neighbor list problem is actually present. For example, a sector with a high offset compared to other sectors suggests that the sector should not be added to a neighbor list and may be indicative, by way of example, of poor network topology.

For example, to a device that has an unobstructed view of a remote sector that serves as the primary sector, all of the local sectors will appear as missing neighbors. It would be error to add the local sectors to the neighbor list of the remote sector. An analysis of the associated signature (high offset, physical proximity of local sectors, etc.) could be used to resolve the issue appropriately (identify that a topology change may be necessary, for example). At the same time, this is an example of a remote sector that should not be on the neighbor lists of the local sectors. Thus, embodiments of the invention also contemplate removing certain sectors from neighbor lists after evaluating the event data.

For example, identifying an environment where a sector that is to be added as a neighbor has an unusually large phase offset than other sectors in the neighbor list could potentially identify a power or azimuth problem with that sector. Adjusting the power or azimuth of that tower would manifest itself in the event data reported by the devices. In other words, that particular sector would no longer be visible and would therefore no longer be included in the event data.

The device or the collection management system (in the case where all the collected data is uploaded to the management system) can then identify 408 or recommend a potential neighbor list for a sector. In other words, the comparison between sectors seen after a call (or other event) and the previous neighbor list can be used to generate a set of sectors that the device should have seen for the primary sector being evaluated. Over time, the collection and management system can receive similar neighbor list data from a large set of wireless devices. This information can be used to identify 410 a recommended neighbor list for the sector in question.

The event data reported by the devices operating in a network can be used to formulate suggested neighbor lists. The recommendations or suggestions for existing neighbor lists can include adding missing sectors to the neighbor lists as well as eliminating certain sectors from the neighbor lists. For example, identifying 410 a neighbor list can be expanded by accounting 412 for additional parameters that may be related to neighbor list errors. For a certain sector, the generation of a neighbor list can also include evaluating certain sectors based on the strength and/or duration of sampling of the radio signal from the sector. Sectors that appear in an existing neighbor list, but at lower powers, can be candidates for removal from a given neighbor list. Other parameters include size of the neighbor list, phase offset of a particular sector relative to other sectors visible to the device, power, load based parameters, time of day, and the like or any combination thereof.

In addition, the neighbor lists generated as described herein can be analyzed with respect to time or day or other load based factors. This analysis identifies whether the load of the network or of the tower is a contributor to variations in the neighbor lists. If it is found that load impacts variations in neighbor lists, then it is likely that capacity may be a problem in that particular area. Thus, the event data that includes information relating to neighbor lists can be used to address neighbor list errors, power or azimuth problems in sectors, capacity issues in the wireless network, deployment issues, and the like. In one embodiment, sectors can be identified to optimize the experience from the perspective of devices. This change in deployment can be influenced by the devices that would be impacted, expected network loads, and the like.

As described above, embodiments of the invention are not limited to efforts to identify missing neighbors. Rather, embodiments of the invention are further directed to methods for identifying the optimal or ideal neighbor list. This can include making no change to a neighbor list, adding sectors to a neighbor list, and/or disqualifying sectors to a neighbor list. Optimizing the neighbor lists distributed to devices can therefore use event data that is generated by the devices at any time and is not limited to event data generated when an event such as a dropped call occurs. Sectors in radio contact with a device when a call is normally completed, an order in which a device encounters sectors in a network, device start up conditions or network acquisition situations, sector phase offsets, physical locations of sectors, event signatures, and other parameters discussed herein, and the like are examples of events and metrics that are used in the optimization of neighbor lists.

Typically, event data is collected or received by the management system 160, which may include one or more servers. The data from multiple devices is then processed and analyzed to generate recommended neighbor lists for various sectors. These neighbor lists can then be distributed and used in the wireless network. In the meantime, event data is continually collected such that the impact of the recommended neighbor lists can be evaluated and readjusted if necessary. Over time, the information gleaned from the event data can lead to more than optimized neighbor lists. It can lead to adjustments to sector broadcast strengths, sector azimuths, tower placement, and the like or any combination thereof.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Those skilled in the art will appreciate that the invention may be practiced in network computing environments with many types of computing system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices or servers that are linked (either by hardwired links, wireless links, or by a combination of hardwired or wireless links) through a communications network. In a distributed computing environment, program modules may be located in both local and remote memory storage devices.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a wireless network where sectors deliver neighbor lists to wireless devices operating in the wireless network, a method for generating a neighbor list for a primary sector, the method comprising:
    receiving event data from a set of devices operating in a wireless network, wherein the event data from the set of devices includes an identifier for a primary sector and a list of sectors visible to the set of devices when using the primary sector;
    for the primary sector, reviewing the event data from the set of devices to identify sectors for inclusion in a recommended neighbor list for the primary sector, wherein reviewing the event data includes evaluating a relative physical location of the sectors to be recommended for inclusion in the recommended neighbor list, wherein the relative physical location is estimated by comparing a phase offset of a particular sector, wherein a sector having a phase offset that is large relative to phase offsets of other sectors is at least one of:
        a candidate for removal from a current neighbor list; or
        not recommended for inclusion in the recommended neighbor list;
    excluding the sector from the recommended neighbor list when the phase offset of the sector is comparatively larger than the phase offset of the other sectors; and
    pushing the recommended neighbor list to the primary sector in the wireless network.

2. The method of claim 1, wherein receiving event data from a set of devices operating in a wireless network further comprises receiving event data that includes a list of sectors visible to each device in the set of devices after a radio session is terminated.

3. The method of claim 1, wherein reviewing the event data from the set of devices to identify sectors for inclusion in a recommended neighbor list for the primary sector further comprises applying a signature to the event data to identify the event data that is attributable to a neighbor list error.

4. The method of claim 1, wherein reviewing the event data from the set of devices to identify sectors for inclusion in a recommended neighbor list for the primary sector further comprises adding sectors to the recommended neighbor list that are not present on the current neighbor list.

5. The method of claim 1, wherein reviewing the event data from the set of devices to identify sectors for inclusion in a recommended neighbor list for the primary sector further comprises removing sectors from the current neighbor list.

6. The method of claim 1, wherein reviewing the event data from the set of devices to identify sectors for inclusion in a recommended neighbor list for the primary sector further comprises evaluating a power level of sectors included in the current neighbor list or visible to each device in the set of devices, the power level being recorded by each device and included in the event data.

7. The method of claim 1 where in the detection of an unexpected physical topology in the identified sectors for inclusion in the recommended neighbor list invokes an external alerting mechanism to indicate an anomalous situation has been detected in the physical topology of the network.

8. The method of claim 1, wherein reviewing the event data from the set of devices to identify sectors for inclusion in a recommended neighbor list for the primary sector further comprises determining if a load on the network is a contributor to a variation in visible sectors reported in the event data.

9. The method of claim 1, further comprising provisioning each device in the set of devices with a collection profile configured to detect and record event data attributable to neighbor list errors.

10. A non-transitory computer readable medium having computer executable instructions for performing the method of claim 1.

11. A method for generating a neighbor list for use by a primary sector, the method comprising:
    recording, in event data, each sector that is visible to a device while using a neighbor list received from the primary sector;
    identifying additional sectors that are in radio contact with the device after experiencing an event that resets neighbor list data of the device, wherein the additional sectors are included in the event data;
    providing the event data to a data collection and management server, wherein the data collection and management server uses the event data along with event data from other devices operating in the network to generate a recommended neighbor list; and
    comparing a phase offset of a particular sector to a phase offset of other sectors included in the event data, wherein if the phase offset of the particular sector is comparatively larger than the phase offset of the other sectors, excluding the particular sector from the recommended neighbor list for the primary sector.

12. The method of claim 11, further comprising generating the recommended neighbor list by adding, to the recommended neighbor list, sectors visible to the device but not included in the current neighbor list.

13. The method of claim 12, further comprising adding the additional sectors visible to the device to the recommended neighbor list.

14. The method of claim 11, further comprising identifying sectors that appear in a neighbor list with low power as candidates for removal from the current neighbor list, wherein the power of each sector visible to the device is included in the event data.

15. The method of claim 11, further comprising at least one of:
    identifying the particular sector as a candidate for removal if the particular candidate is on the current neighbor list;
    not recommending the particular sector for inclusion in the recommended neighbor list;
    adjusting one of a power or an azimuth of the particular sector; or
    identifying an unexpected topology in the network.

16. The method of claim 11, further comprising incorporating load based parameters, time of day into the generation of the recommended neighbor list.

17. The method of claim 11, further comprising pushing the recommended neighbor list to the sector.

18. A non-transitory computer readable medium having computer executable instructions for performing the method of claim 11.

19. A method for generating recommended neighbor lists for sectors in a wireless network, the method comprising:
   recording event data according to a collection profile each time each device in the set of devices receives a current neighbor list from a sector, wherein the event data identifies a particular sector that provided the neighbor list and all sectors that are visible to the device;
   identifying new sectors visible to the device after usage of the device that are not included in the current neighbor list;
   identifying a power or azimuth problem in a certain sector in the current neighbor list based on a phase offset associated with the current sector when compared to phase offsets of other sectors in the current particular neighbor list and excluding the certain sector from a recommended neighbor list; and
   identifying the recommended neighbor list that includes the new sectors.

20. The method of claim 19, further comprising one or more of:
   accumulating event data from the set of devices, wherein the event data includes additional sectors that are either included in the recommended neighbor list or removed from the current neighbor list;
   recommending sectors for removal from the current neighbor list that have low power or that do not appear at high power in the event data from the set of devices;
   recommending sectors for inclusion or exclusion in the recommended neighbor list based on a phase offset of each sector;
   identifying unexpected phase offsets of sectors in the current neighbor list and in the new sectors; and
   analyzing variations in the current neighbor list based on load parameters in the wireless network.

21. The method of claim 19, further comprising identifying a capacity problem based on load based variations in neighbor lists derived from the event data received from the set of devices.

22. The method of claim 19, further comprising identifying a deployment problem in the wireless network based on the event data.

23. In a wireless network that provides guidance information to participating device as to which network elements can or should be utilized to maintain wireless communications, a method for configuring the wireless network, the method comprising:
   recording event data from one or more wireless devices, the event data including one or more events and further comprising:
      radio information identifying current guidance information utilized by the one or more wireless devices during the one or more events, current radio resources utilized at the time of the one or more events included in the event data, and radio elements of the network utilized during the one or more events included in the event data; and
   providing the event data to a data collection and management server, wherein the data collection and management server utilizes the event data to generate new configuration data to be distributed as guidance information to the one or more wireless devices for subsequent events;
   identifying a power or azimuth problem in a sector based on a phase offset associated with that sector when compared to phase offsets of other sectors in a particular neighbor list; and
   excluding the sectors with the power or azimuth problem from the configuration data.

24. The method of claim 23, where the wireless network comprises a CDMA network.

25. The method of claim 24, where the guidance information comprises a neighbor list.

26. The method of claim 25, where the current radio resources comprises a sector.

27. The method of claim 23, wherein the radio element of the network comprises sectors used within the one or more events.

28. The method of claim 23, wherein the data collection and management server recommends first radio elements for inclusion in the guidance information and/or second radio elements for removal from the guidance information.

29. The method of claim 23, wherein the wireless devices include one or more of cellular telephones, pagers, laptop computers, personal digital assistants or network compatible devices.

30. The method of claim 23, further comprising analyzing the event data to detect radio communication problems in the wireless network, the communication problems including one or more of:
   identifying unexpected phase offsets of radio resources to radio elements;
   analyzing variations in the guidance information based on load parameters in the wireless network;
   identifying a capacity problem based on load based variations in the radio information obtained from the event data received from the one or more wireless devices; or
   identifying a deployment problem in the wireless network based on the event data.

* * * * *